United States Patent [19]
Yang et al.

[11] Patent Number: 4,885,105
[45] **Date of Patent: * Dec. 5, 1989**

[54] FILMS FROM PVA MODIFIED WITH NONHYDROLYZABLE ANIONIC COMONOMERS

[75] Inventors: Chihae Yang, Pleasanton; Edward J. Kaufmann, San Ramon, both of Calif.

[73] Assignee: The Clorox Company, Oakland, Calif.

[ * ] Notice: The portion of the term of this patent subsequent to May 31, 2005 has been disclaimed.

[21] Appl. No.: 175,778

[22] Filed: Mar. 31, 1988

Related U.S. Application Data

[63] Continuation-in-part of Ser. No. 50,260, May 14, 1987, Pat. No. 4,747,976.

[51] Int. Cl.[4] .................... C11D 17/04; C08F 20/04; C08T 5/18; C08L 29/04

[52] U.S. Cl. .................... 252/90; 252/93; 252/99; 252/135; 252/156; 252/529; 252/548; 252/549; 252/DIG. 3; 252/174.24; 525/60; 525/61; 206/524.3; 206/524.5; 206/524.7

[58] Field of Search .................... 252/90, 93, 99, 135, 252/156, 174.24, 529, 548, 549, DIG. 3; 525/60, 61; 206/524.3, 524.5, 524.7

[56] References Cited

U.S. PATENT DOCUMENTS

| | | | |
|---|---|---|---|
| 1,897,856 | 2/1933 | Noller . | |
| 2,328,922 | 9/1943 | Neher | 260/84 |
| 2,403,004 | 4/1946 | Kenyon | 260/84 |
| 2,467,774 | 4/1949 | Plambeck, Jr. | 260/86 |
| 2,715,590 | 8/1955 | Brockman et al. | 117/138.8 |
| 3,005,809 | 10/1961 | Lowell et al. | 260/85.7 |
| 3,198,740 | 8/1965 | Dunlop, Jr. | 252/90 |
| 3,284,364 | 11/1966 | Siegele | 252/132 |
| 3,299,012 | 1/1967 | Kern | 260/78.5 |
| 3,300,546 | 1/1967 | Baechtold | 260/876 |
| 3,409,598 | 11/1968 | Takigawa | 260/78.5 |
| 3,513,142 | 5/1970 | Blumberg | 260/85.7 |
| 3,689,469 | 9/1972 | Inskip | 260/86.1 |
| 3,892,905 | 4/1975 | Albert | 428/220 |
| 3,904,806 | 9/1975 | Waggoner | 428/511 |
| 4,115,292 | 9/1978 | Richardson et al. | 252/90 |
| 4,119,604 | 10/1978 | Wysong | 260/33.2 R |
| 4,155,893 | 5/1979 | Fujimoto | 260/29.6 |
| 4,155,971 | 5/1979 | Wysong | 260/204 |
| 4,156,047 | 5/1979 | Wysong | 428/220 |
| 4,172,930 | 10/1979 | Kajitani et al. | 525/26 |
| 4,359,440 | 11/1982 | Lakshmanan | 264/171 |
| 4,539,263 | 9/1985 | Hoh | 428/500 |
| 4,544,698 | 10/1985 | Roullet et al. | 524/503 |
| 4,550,141 | 10/1985 | Hoh | 525/221 |
| 4,557,852 | 12/1985 | Shulz et al. | 252/95 |
| 4,602,062 | 7/1986 | Larkin | 525/61 |
| 4,611,029 | 9/1986 | Takahashi | 525/61 |
| 4,626,372 | 12/1986 | Kaufmann et al. | 252/90 |
| 4,654,395 | 5/1987 | Shulz et al. | 526/318.42 |
| 4,747,976 | 5/1988 | Yang et al. | 252/99 |

FOREIGN PATENT DOCUMENTS

| | | |
|---|---|---|
| 201397 | 8/1955 | Australia . |
| 0079712 | 5/1983 | European Pat. Off. . |
| 61-57700 | 3/1986 | Japan . |
| 61-97348 | 5/1986 | Japan . |
| 2090603 | 4/1982 | United Kingdom . |

OTHER PUBLICATIONS

Gohsenal T-series product brochure, 12/20/85.
DuPont Elvanol 75-15 product brochure 9/80.

*Primary Examiner*—Paul Lieberman
*Assistant Examiner*—Helene Kirschner
*Attorney, Agent, or Firm*—Michael J. Mazza; Joel J. Hayashida; Stephen M. Westbrook

[57] ABSTRACT

A PVA film modified with anionic comonomers is provided for use as a water-soluble seal or pouch for alkaline or borate-containing cleaning compositions. The films comprise copolymers of 90–100% hydrolyzed vinyl alcohol with a nonhydrolyzable anionic comonomer, and have molecular weights characterized by a viscosity range of 4–35 cPs. The films are resistant to insolubilization caused by alkaline or borate-containing additives, are storage stable over a wide range of temperature and humidity storage conditions, rapidly and fully solubilize in a wash solution, and do not significantly impair cleaning performance of an additive enclosed within.

23 Claims, No Drawings

FILMS FROM PVA MODIFIED WITH NONHYDROLYZABLE ANIONIC COMONOMERS

CROSS-REFERENCE TO RELATED APPLICATIONS

This is a Continuation-in-Part of Ser. No. 07/050,260, filed May 14, 1987, now U.S. Pat. No. 4,747,976 entitled "PVA Films with Nonhydrolyzable Comonomers", assigned to the same assignee as the invention herein.

BACKGROUND OF THE INVENTION

1. Field of the Invention

The invention relates to free-standing water-soluble polymeric films and more particularly to such films in the form of pouches and containing alkaline or borate-containing cleaning compositions.

2. Description of Related Art

A great deal of art relates to water-soluble polymeric films including polyvinyl alcohol. Much of the art has been addressed to the problem of packaging materials in such water-soluble films. As used herein, the term film describes a continuous, homogenous, dimensionally stable polymer having a small thickness in relation to area. As also used herein "polymer" means a macromolecule made up of a plurality of chemical subunits (monomers). The monomers may be identical or chemically similar, or may be of several different types. Unless a more specific term is used, "polymer" will be taken to include hetero- and homo-polymers, and random, alternating, block and graft copolymers. "Copolymer" will be used to specifically refer to those polymers made from two different repeating chemical monomers. An effective water-soluble package would simplify dispensing, dispersing, slurrying, or dissolving materials contained within, as the entire package could be dumped into a mixing vessel without the need to pour out the contents. Water-soluble film packages could be used where the contents are toxic or messy, where the contents must be accurately measured, or maintained in an isolated environment, and further allow delivery of materials which are only metastable when combined, and which would ordinarily separate during storage. Soluble pre-measured pouches aid convenience of consumer use in a variety of applications, particularly those involving cleaning compositions. Such cleaning compositions may include, for example, detergent formulations for ware-washing applications, detergent compositions for washing of clothes, and laundry additives such as peroxygen bleaches, fabric softeners, enzymes and related products. Pouching cleaning compositions presents the added problem of highly-alkaline contents which can interact with polyvinyl alcohol (PVA) films, which surprisingly severely reduces their solubility, strength, or both. The presence of borate in cleaning compositions (e.g. those containing perborate bleaches) can cause cross-linking of the PVA, reducing its solubility in water. The prior art has attempted to minimize the deleterious effects of borate ions by including a borate scavenger such as sorbitol in the film formulation.

The use of PVA films to contain cleaning compositions is further hampered by variations in solubility caused by the range of water temperatures employed. PVA films of the art generally exhibit varying solubilities in hot (above about 49° C.), warm (about 35° C.) and cold (below about 21° C.) water, depending on the residual acetate content. In addition to the need for rapid film solubility under a variety of wash conditions, the films must be stable over typical storage periods and under a variety of environmental conditions. For example, a film pouch containing a detergent product may be stored under conditions of moderate temperature and humidity, under high temperature and low humidity, or high temperature and high humidity. The latter is not uncommon in certain areas of the Southeastern United States. In high humidity conditions, water can penetrate the film, and if an alkaline detergent is present, can have an adverse impact on the film's integrity. One approach to correcting this problem has been to modify or restrict the amount of alkaline material within the pouch. This can, however, have an adverse impact on the cleaning performance. Another problem with water-soluble PVA film pouches for fabric laundering is the adverse effect of the PVA on cleaning performance.

U.S. Pat. No. 3,892,905 issued to Albert discloses a cold-water soluble film which may be useful when packaging detergent. Albert, however, does not solve the problem of insolubilization due to alkaline or borate-containing compounds. Great Britain patent application 2,090,603, to Sonenstein, describes a packaging film having both hot and cold-water solubility and made from a blend of polyvinyl alcohol and polyacrylic acid. The acrylic acid polymer acts as an alkalinity scavenger, but as the acrylic acids become neutralized, the blend loses its resistance to alkalinity and becomes brittle. The polymers of Sonenstein are not compatible, and preferably are made separately, then blended. This means an extra process step, and the blend may result in a poor quality film. Dunlop, Jr., U.S. Pat. No. 3,198,740 shows a cold-water soluble detergent packet of PVA containing a granular detergent having a hydrated salt to maintain moisture in the film, but without apparent benefit to solubility. U.S. Pat. No. 4,115,292 issued to Richardson et al shows compositions with enzymes embedded in water-soluble PVA strips, which are in turn encased in a water-soluble film pouch which may be PVA. Lowell et al, U.S. Pat. No. 3,005,809 describes copolymers of PVA with 4–10 mole percent of a crotonic acid salt from which films can be made to package neutral, chlorine-liberating compounds. Lowell et al does not teach or suggest any solubility benefits when the films are used to package alkaline or borate-containing detergent compositions.

Inskip, U.S. Pat. No. 3,689,469 describes a hot-water soluble copolymer of about 100% hydrolyzed vinyl acetate and about 2 to 6 weight percent methyl methacrylate, and is made to minimize the presence of acid groups. The copolymer can be hydrolyzed using a basic catalyst to form lactone groups, and has utility as a textile yarn warp-sizing agent. Neher, U.S. Pat. No. 2,328,922 and Kenyon, U.S. Pat. No. 2,403,004 disclose copolymers of vinyl acetate and acrylic esters, and teach lactone formation to obtain insoluble films. Takigawa, U.S. Pat. No. 3,409,598 teaches a process for formation of a water-soluble film using a copolymer of vinyl acetate and an acrylic ester. U.S. Pat. Nos. 3,513,142 issued to Blumberg, and 4,155,893 issued to Fujimoto disclose copolymers of vinyl acetate and a carboxylic ester-containing comonomer. Schulz et al, U.S. Pat. No. 4,557,852 describes polymeric sheets which do not include polyvinyl alcohol, but are addition polymers containing high amounts of water-insoluble monomers such as alkyl acrylates and water-soluble anionic monomers such as acrylic salts, and is directed to maintaining flexibility of the sheet during storage.

Kaufmann et al, U.S. Pat. No. 4,626,372 discloses a PVA film having a polyhydroxy compound which reacts with borate to afford the film good solubility in the presence of borate. Roullet et al, U.S. Pat. No. 4,544,698, describes a PVA and latex combination used as gas-tight moisture resistant coating agents for packaging materials. The latex may include acrylates or methacrylates and vinylidene polychloride polymerized with acrylate, methacrylate or itaconic acid.

The problem of enclosing an alkaline or borate-containing laundry product in a water-soluble pouch, which is sufficiently strong for a commerical product, remains storage stable for durations and under environmental conditions typically encountered, and remains water-soluble over a range of wash/rinse temperatures typically encountered in the household, has not been successfully resolved. Accordingly, it is an object of the present invention to provide a water-soluble film and process for making the same which retains its water solubility in the presence of an alkaline or a borate-containing cleaning composition.

It is another object of the present invention to provide a free-standing film which is water-soluble and stable during storage over a wide range of temperatures and humidities.

It is another object of the present invention to provide a water-soluble film which can be used to package a cleaning composition and does not have deleterious effects on the performance thereof.

It is yet another object of the present invention to provide a dissolvable laundry additive packet which can be used with alkaline or borate-containing laundry additives.

It is another object to provide a pre-measured, conveniently packaged dose of cleaning composition which is easily stored, handled and delivered to a washing machine, and will rapidly release the cleaning composition into the wash liquor.

SUMMARY OF THE PRESENT INVENTION

In one embodiment, the present invention is a film formed from a resin having a vinyl acetate monomer copolymerized with a comonomer selected from a hereinafter defined group. After such copolymerization, and a conversion step, the comonomers are characterized by the presence of an anionic species, and are hereinafter referred to as "nonhydrolyzable" comonomers. The conversion step comprises at least a base catalyzed saponification step, in an organic solvent, to convert residual acetate groups to alcohols, and to produce the anionic species characterizing the nonhydrolyzable comonomer. In some cases, the presence of adjacent alcohols and carboxylic esters causes the formation of internal lactone rings. By the additional conversion step of subsequently treating the resin with a base, the lactones can also be converted to the anionic form, resulting in an anionic resin from which a film can be made. This latter step is a hydrolysis step. It has been surprisingly found that by selecting the type and content of comonomer, the molecular weight of the PVA resin, and the degrees of hydrolysis of the vinyl acetate, lactonization and ionomer content, and depending on the type of base used to neutralize the copolymer, a film can be made which exhibits relatively temperature-independent water solubility, and is not rendered insoluble by alkaline or borate-containing detergent compositions. Further, the film is sufficiently strong to be formed into a free-standing pouch which may be used to package cleaning compositions, particularly alkaline or borate-containing cleaning compositions. The film is resistant to insolubilization caused by high humidity storage conditions, hence is stable over a typical storage shelf life. The films can be produced from a single polymer solution, without the need for making separate polymer solutions, which may be incompatible when mixed for film production. In a second aspect of the present invention, the films are formed into pouches and are used as soluble delivery means for cleaning compositions. Such cleaning compositions include, but are not limited to dry granular, liquid and mulled detergent compositions, bleaches, fabric softeners, dishwashing detergents, combinations thereof, and other compositions for improving the aesthetics, feel, sanitation or cleanliness of fabrics or wares. The invention is particularly well suited for containing detergent mulls such as those described in European published patent application No. 0,158,464, filed March 21, 1985, entitled "Low-temperature effective detergent compositions and delivery systems therefor", and 0,234,867, filed February 19, 1987, entitled "Concentrated non-phosphate detergent paste compositions", both of which are assigned to the same assignee as the present invention, the specifications of which are incorporated herein by reference. These mulls may be highly viscous gels or pastes and include relatively high concentrations of nonionic surfactants for effective removal of oily soils. The mulls are formulated to have alkaline detergent builders which aid in particulate soil removal, and are formulated to provide optimum cleaning power, not for ease of delivery. The preferred delivery method, both for convenience and accuracy, is to include a pre-measured amount of the mull within the water-soluble pouch of the present invention.

It is therefore an advantage of the present invention that high-surfactant, high-builder detergent mulls can be conveniently packaged, stored and delivered.

It is another advantage of the present invention that the films used to package laundry additives remain soluble over the entire range of typical wash temperatures and times.

It is another advantage that the films of the present invention will retain their solubility in contact with alkaline or borate-containing detergents.

It is yet another advantage that the films can be made from a single polymer resin solution.

It is still another advantage of the present invention that the films and film pouches containing detergent remain storage stable over a broad range of environmental conditions.

DETAILED DESCRIPTION OF THE PREFERRED EMBODIMENTS

In a first embodiment, the present invention comprises a free-standing film of a vinyl acetate monomer copolymerized with a comonomer which is converted to yield the nonhydrolyzable comonomer containing an anionic species. Preferably, the anionic species characterizing the nonhydrolyzable comonomer is a carboxylate or sulfonate. Residual acetate groups commonly found in PVA resins are susceptible to alkaline hydrolysis when the resin, or a film made therefrom is exposed to a source of alkalinity. As used herein, the term nonhydrolyzable comonomer is defined to include those repeating units in a PVA copolymer not normally susceptible to hydrolysis by such sources of alkalinity. The nonhydrolyzable comonomers are characterized by the presence of an anionic group, and may be derived from carboxylic acids and salts thereof, carboxylic esters, amides, imides, acyl halides, anhydrides and sulfonates, and impart a degree of water solubility to the resin. This water solubility of the resin should be such that films produced therefrom, having a thickness between about 1 to 5 mils, will disperse and substantially dissolve in 70°-130° F. (21°-54° C.) water in less than about fifteen minutes, preferably less than about five minutes. Subsequent to copolymerization, the nonhydrolyzable comonomer results from the conversion step(s) of, saponification (which also hydrolyzes acetate groups of the polymer to alcohols), or saponification followed by alkaline hydrolysis. The latter hydrolysis step is used when the comonomer is such that lactones are formed as a result of the saponification step. As used herein, the term saponification includes either a base-catalyzed hydrolysis in an organic solvent, or a base catalyzed hydrolysis in an organic solvent followed by the neutralization of excess base and removal of solvent. Preferred bases to catalyze the saponification are the alkali metal hydroxides, including sodium and potassium hydroxide. The organic solvent need not be exclusively organic solvent, but may include some water. Also as used herein, hydrolysis refers to the conversion, usually in a predominately aqueous medium, of a neutral molecule, (e.g. a lactone) to an anionic form, by a source of alkalinity. The presence of adjacent alcohols and carboxylic esters causes internal lactonization of the copolymer resin, but in the presence of a base such as an alkali metal hydroxide, the lactone rings open to form anionic groups, i.e., the salts of the resulting carboxylic acids. Depending on the degree of hydrolysis of the polyvinyl alcohol, the type and percent nonhydrolyzable comonomer content, the degree of lactone conversion, and the type of base used in the hydrolysis step, the resulting resin can be formulated to exhibit varying degrees of water solubility and desired stability characteristics. The anionic groups may be formed during resin or film production, or after film formation. Films can be made with the inventive resin as is known in the art, for example, by solution casting or extrusion, and may be used to pouch gel or mull detergent compositions. Such mulls include detergent builders containing relatively high levels of nonionic surfactants to yield superior oily soil cleaning performance.

A second embodiment of the present invention comprises a film, made as described in the first embodiment, and fabricated into a pouch. Contained within is a cleaning composition which preferably is a highly viscous, gel or paste detergent composition containing at least one nonionic surfactant and an alkaline builder.

Copolymeric Resins

Polyvinyl alcohol (PVA) resin is widely used as a film forming material, and has good strength and water solubility characteristics. Two parameters significantly affecting PVA solubility are molecular weight and degree of hydrolysis. Commercially available films range in weight average molecular weight from about 10,000 to 100,000 g/mole. Percent hydrolysis of such commercial PVA films is generally about 70% to 100%. Because PVA is made by polymerizing vinyl acetate and subsequently hydrolyzing the resin, PVA can and typically does include residual acetates. The term "polyvinyl alcohol" thus includes vinyl alcohol and vinyl acetate copolymers. For solubility purposes, a high degree of hydrolysis, e.g., 95% renders the film relatively slowly soluble in water. Lower degrees of hydrolysis, e.g. 80-95%, improve solubility rates. In an alkaline environment however, these films become relatively insoluble due to the continued hydrolysis of the partially hydrolyzed film. Higher molecular weight films generally exhibit the best mechanical properties, e.g., impact strength, however solubility rates may be reduced.

It has been surprisingly found that films of the present invention, which are capable of being made into pouches, are storage stable, rapidly soluble over a wide temperature range and are not deleterious to cleaning performance, can be produced from vinyl acetate copolymerized with about 2-6 mole percent of a comonomer, to an extent to yield a resin with a molecular weight characterized by a viscosity of between about 4 to 35 cPs as measured in a 4% solution at 25° C., the resin being saponified such that there are 0-10% residual acetate groups, and the comonomers being selected such that subsequent to polymerization, they are converted to nonhydrolyzable comonomers having an anionic charge. As used herein, unless otherwise noted, the resin viscosity is measured after copolymerization and saponification, but before any further treatment of the resin. Mole percentage of comonomer is a measure of the ratio of the number of moles of comonomer to the number of moles of vinyl acetate plus comonomer. Preferably the resin viscosity should be in the range of between about 4-35 cPs, and the mole percentage nonhydrolyzable comonomer is about 1-6 percent. Generally, it is desirable to increase the percentage of nonhydrolyzable comonomer as resin viscosity increases, up to the limit of the range. The most preferred nonhydrolyzable comonomer is that which results from the conversion of the methyl acrylate comonomer. The most preferred mole percentage of this nonhydrolyzable anionic comonomer is 3-5%, and it is further most preferred that the resulting resin have a viscosity of about 10-20 cPs.

The comonomers which, when copolymerized with vinyl acetate and converted, result in the nonhydrolyzable comonomers having an anionic species, include carboxylic acids and salts thereof, carboxylic esters, amides, imides, acyl halides, anhydrides and sulfonates. Examples of suitable comonomers include unsaturated acids such as acrylic, methacrylic, cis 2-butenoic, 3-butenoic, cinnamic, phenylcinnamic, pentenoic, methylene malonic, the alkali metal and ammonium salts thereof and the acyl halide derivatives thereof; unsaturated esters, amides, and acyl halides of the following structure I:

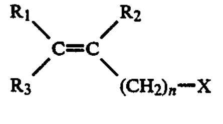

I wherein $R_1$, $R_2$ and $R_3$ are H, or alkyl, aryl or hydroxyalkyl groups, n is 0 or 1, and X is $—CO_2R_4$, $—C(O)NR_4R_5$ or —COY (wherein $R_4$ is H, or an alkyl, aryl, alkenyl, hydroxyalkyl, oxyalkyl or cyanoalkyl group, $R_5$ is H or an alkyl, aryl or hydroxyalkyl group, and Y is a halide); unsaturated diacids and their stereoisomers of the following structure II:

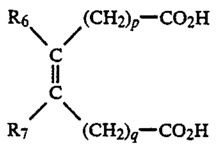

II wherein p and q are integers from 0–5, $R_6$ and $R_7$ are H, or alkyl or aryl groups, and alkali metal and ammonium salts thereof; anhydrides, acyclic and cyclic esters, amides and imides derived from structure II; unsaturated sulfonic acids and derivatives thereof, and mixtures thereof.

Most suitable comonomers include acrylic acid, methacrylic acid, methylene malonic acid, methyl acrylate, methyl methacrylate, acrylamide, maleic and itaconic acid anhydrides, methyl esters of maleic and itaconic acids, vinyl sulfonate, and mixtures thereof. Conversion of the comonomer to the anionic, nonhydrolyzable comonomer is accomplished by saponification as defined hereinbefore.

Some comonomers that are carboxylic acid derivatives, e.g., methyl acrylate and methyl methacrylate, yield lactones on saponification, owing to the presence of adjacent carboxylic esters and alcohols. It has been further surprisingly found that films produced from such lactonized resins do not have acceptable solubility characteristics. For such resins the conversion to anionic form requires alkaline hydrolysis following saponification. The alkaline material used to convert lactones to anionic form may be added before, during or after film production. Operable alkaline materials include but are not limited to alkali metal and alkaline earth metal hydroxides, particularly sodium, lithium and potassium hydroxide, and quaternary ammonium hydroxides, particularly tetraethanol and tetraethyl ammonium hydroxides. Depending on the alkaline material selected, the character of the resulting film can be altered somewhat. For example, solubility of the film is greatest when lithium hydroxide is employed, followed by the sodium, potassium, and quaternary ammonium hydroxides. Film strength is greatest when the quaternary ammonium compounds are used. The alkaline material is added in an amount sufficient to attain the desired mole percentage nonhydrolyzable comonomer, i.e., about 1–6 mole percent.

Conversion of the lactone to anionic form may occur as part of the resin or film production process, or after the film has been made but before it is intended to dissolve in water. The introduction of a cleaning composition to the film will result in a degree of anion formation if the cleaning composition is sufficiently alkaline.

Other Film Components

The following components are also present in the films of the present invention, and may be added to the resin during film production. A plasticizer is added to the resin to plasticize the copolymeric resin and allow film formation therefrom. Generally any plasticizer known in the art for use with PVA resins will function with the present invention. Preferred are aliphatic polyols, especially ethylene glycol, propylene glycol, glycerol, trimethylolpropane, polyethylene glycol, and mixtures thereof. Particularly preferred is a mixture of polyethylene glycol having a molecular weight of about 200–400 g/mole, and glycerol. The total plasticizer content is about 0 to 45% by weight of the film composition, preferably about 15 to 30 wt % of the film.

A surfactant may be added to the resin mixture to aid in film production by reducing foaming and helping to ensure dispersion and wetting of the composition ingredients. Preferred for this purpose are ethoxylated aliphatic alcohols and ethoxylated alkylphenols. The surfactant may be added in an amount of from 0% to about 1.0%, preferably from about 0.01% to 0.05%.

To improve solubility of the film in contact with borate-containing additives, a borate scavenger may be added. The borate scavenger is preferably a polyhydroxy compound (PHC) capable of binding to the borate to form a borate-PHC complex. A number of PHC compounds are known in the art to complex with borate such as sorbitol, mannitol, catechol and pentaerythritol. Sorbitol is preferred, and may be added in an amount of from 0 to about 30%, preferably from about 5 to 20%. A more detailed disclosure of the use of polyhydroxy borate scavengers can be found in U.S. Pat. No. 4,626,372 issued to Kaufmann et al and assigned to the same assignee as the present invention, the disclosure of which is incorporated herein by reference.

Other film additives as known in the art may be included by mixing with the resin. These include antioxidants, release agents, antiblocking agents, and antifoamers, all of which are added in amounts sufficient to perform their intended function as known in the art and generally between 0 and about 1% by weight. Film thickness may vary from about 1.0 to 5.0 mils, preferably about 1.5 to 2.5 mils.

In a second embodiment, the films are used in combination with liquid, solid, granular, paste or mull cleaning compositions to result in a pre-measured, water-soluble packet for cleaning purposes. The cleaning composition may advantageously contain relatively high levels of nonionic surfactants and/or alkaline builders for superior cleaning performance, and/or borate-releasing compounds to provide oxidizing power effective against organic stains. The films of the present invention retain their desired solubility, strength and stability characteristics despite the presence of such alkaline builders or borate, which render ordinary PVA films insoluble, unstable or both. The alkaline cleaning compositions are generally defined as those which generate a pH of greater than about 8 when dissolved to a level of about 1% in an aqueous medium. Borate-containing cleaning compositions are generally defined as those yielding a borate ion concentration, in water, of greater than about $2.0\times10^{-4}$M. A more detailed description of an example of a detergent mull for which the films of the present invention are particularly adapted for delivering can be found in the previously described European application Nos. 0,158,464, and 0,234,867.

The amounts of builders and surfactants which can be included can vary considerably depending on the nature of the builders, the final desired viscosity and the amount of water added to the surfactant system. Other additives commonly found in detergent compositions can be included in the formulations herein. These include but are not limited to additional surfactants, fluorescent whitening agents, oxidants, corrosion inhibiting agents, anti-redeposition agents, enzymes, fabric softeners, perfumes, dyes and pigments. The detergent composition herein may include phosphate or nonphosphate builders.

The following nonlimiting examples are provided to further illustrate the present invention.

EXAMPLE A

A copolymeric resin was made by copolymerizing vinyl acetate and methyl acrylate to yield about 30 g of the copolymer having a 20,000–25,000 g/mole weight average molecular weight (with an approximate viscosity of 6 cPs) and 4.5 mole percent methyl acrylate. The resin was saponified to convert 100% of the acetate groups to alcohols and to cause the formation of lactones. The resin had an initial lactone mole percentage of about 4.5%, and a melting temperature of 206° C. About 30 g of the resin was added to about 190 g of deionized water, and stirred to disperse. About 4 g of a plasticizer, plus about 2 g of a borate scavenger were added to the resin and small quantities (under about 0.5%) of an antiblocking/release agent and an antioxidant were added. The dispersion was heated for about two hours at 60°–70° C. to fully dissolve the resin. To this solution sufficient NaOH was added, with heating, to hydrolyze about 1 to 4 mole percent of the lactone groups to anionic form.

The solution was heated for an additional five hours at 60°–70° C. to complete the hydrolysis, and was then slowly cooled to about 23° C. and deaerated. The solution was cast on a stainless steel plate using a film applicator with a 0.2 cm clearance. The resulting film was dried at 61° C. for about 30 minutes, cooled to room temperature, and removed from the plate. This procedure yielded a film about 2.5 mils thick, and containing about 70.3% copolymer, 14.3% plasticizer, 7.2% borate scavenger, and 8.2% water.

All of the solubility data were obtained by placing the film in a test device (a 35 mm format slide having a 3 cm×4.5 cm aperture) in a 600 ml beaker containing about 325 ml of deionized water. Washing machine agitation was simulated by stirring the test solution with a magnetic stirrer at a speed sufficient to result in a vortex extending downward for about 20% of the solution depth. In simulations involving borate, $Na_2B_4O_7$ was added to the water to result in a borate concentration of about $1.7\times10^{-3}$M, and the pH was adjusted to 10.7 with sodium carbonate/bicarbonate. Solubilities of films stored in contact with alkaline cleaning products were determined after the films were removed from contact with the cleaning products and any residual cleaning product adhering to the films was wiped off. Film solubilities were visually evaluated as percentage film residue remaining after 300 seconds in the stirred beaker. Separate studies showed that if the film fully dissolved after 300 seconds in the beaker, no undissolved film residue would be expected from pouched cleaning products in actual use conditions.

EXAMPLES B–I

Example B was made as described for Example A, with the copolymeric resin polymerized to have a molecular weight corresponding to about 10 cPs instead of the 6 cPs. Examples C, D and E were made as described for Example A, but were polymerized to have viscosities of 14 cPs, 17 cPs and 30 cPs, respectively. Example F was made as Example A with methyl methacrylate instead of methyl acrylate, and with a viscosity of about 15 cPs. Example G was made by copolymerizing vinyl acetate and maleic anhydride, and had a viscosity of 17 cPs. Example G did not, however, require the subsequent alkaline hydrolysis step of Example A, as the comonomer of Example G was already in anionic form.

Examples H and I are prior art polymers of 88% hydrolyzed PVA.

EXPERIMENTAL RESULTS

I. Effects of Resin Viscosity and Copolymer Type and Percent on Alkaline Stability The alkaline stability of films using various PVA copolymer resins was observed for the following films. Long term film storage in contact with an alkaline detergent was simulated by storing the films in a saturated NaCl solution with the pH adjusted with NaOH to about 12. Dissolution was observed after storage times of 2, 4, 8 and 24 hours in the solution. This test, termed an "accelerated test", simulated in 2 and 4 hours the effect of actual storage for one and two weeks at 32° C./85% RH. The 8 and 24 hour storage conditions simulated prolonged actual storage at high humidity. Results are given as percent film remaining after 300 sec in a beaker under the test conditions as outlined previously. Zero percent film remaining indicates desired solubility. The dissolution medium was 21° C. water.

TABLE 1

| Film | Resin Viscosity cPs | Comonomer Type | Comonomer Total Mole % | Mole % Residual Acetate | Solubility (% Film residue after 300 sec in 21° C. water) 2 | 4 | 8 | 24[1] |
|---|---|---|---|---|---|---|---|---|
| A | 6 | Acrylate* | 4.5 | 0 | 0 | 0 | 0 | 0 |
| B | 10 | Acrylate* | 4.5 | 0 | 0 | 0 | 0 | 0 |
| C | 14 | Acrylate* | 4.5 | ≦1 | 0 | 0 | 0 | 0 |
| D | 17 | Acrylate* | 4.5 | 0 | 0 | 0 | 0 | 0 |
| E | 30 | Acrylate* | 4.5 | 0 | 0 | 0 | 0 | 0 |
| F | 15 | Methacrylate* | 2.7 | 0 | Trace | 0 | 0 | 0 |
| G | 17 | Maleate | 2.3 | 3–5 | 0 | 0 | 0 | 0 |
| H | 5 | None | — | 12 | 0 | 50<br>100 | — | |
| I | 13 | None | — | 12 | 0 | 100 | 100 | — |

*methyl esters
[1]Hours in accelerated test solution

This table illustrates that films A–G which are prepared in accordance with the present invention, maintain their solubility under extreme alkaline storage conditions. Films H and I, which are prior art films of vinyl alcohol and vinyl acetate, quickly lose their solubility.

II. Long-term Stability of Film A with Alkaline Paste Detergent

Pouches of an alkaline paste detergent containing a nonionic surfactant, sodium tripolyphosphate, $Na_2CO_3$, silicate, protease, and a fragrance were prepared using Films D and H. These pouches were exposed to the following storage conditions in a cycling temperature/humidity room, and monitored for film solubility. The cycling room is designed to cycle temperature and humidity from 21° C./87% RH to 32° C./65% RH and back over a 24 hour period. These conditions simulate actual weather conditions found in humid regions of the United States.

TABLE 2

| Film | Solubility (21° C. water) % film Residue After 300 Sec. Cycling Room 8 weeks | 21° C./50% R.H. 6 weeks + Cycling Room 3 weeks |
|---|---|---|
| D | 0 | 0 |
| H | 80 | 75 |

Table 2 demonstrates that the films of the present invention are not insolubilized by hot and/or humid environmental conditions, whereas the prior art PVA film (film H) became, for practical purposes, insoluble under the same conditions.

III. Stability of Film C with Additional Cleaning Products

TABLE 3

| Product | Solubility(1) Film C | Film H |
|---|---|---|
| Dry Detergent 5% Perborate (pH 10.7*) | 0 | Trace |
| Dry Bleach 15% Perborate (pH 11.2*) | 0 | 25% |
| Dry Automatic Dishwashing Detergent (PH 10.3*) | 0 | 10% |

*of a 1% solution
(1)Percent of film remaining after 300 sec. in 21° C. water following storage in a cycling room for 4 weeks.

Table 3 shows the usefulness of the films of the present invention with borate-containing, and highly alkaline additives. It is thought that the anionic nature of the films functions to repel borate anions, and to prevent cross-linking which renders prior art films insoluble.

It has been surprisingly found that molecular weight as represented by viscosity of a 4% polymer solution, and comonomer type and content can impact the cleaning performance of laundry detergents on certain soils, (e.g., on clay soil). Cleaning performance was evaluated by measuring percentage soil removal as a change in fabric reflectance. Swatches of cotton fabric were prepared and stained with BANDY BLACK clay (a trademarked product of the H. C. Spinks Clay Co.), and washed in a commercially available washing machine. Test conditions included 68L of 38° C. water at a hardness of 100 ppm ($Ca^{2+}$ and $Mg^{2+}$ in a 3:1 ratio). A 1.8 g piece of film and 53.7 g of paste detergent were used in the evaluation.

Reflectance values of the swatches were measured on a Gardner colorimeter before and after the wash, and the data were analyzed using the Kubelka-Munk equation.

IV. Effect of Polymer Solution Viscosity and Anionic Nonhydrolyzable Comonomer Content on Cleaning Performance

TABLE 4

| Film | Resin Viscosity(1) cPs | Mole % Anionic Comonomer | Cleaning Performance (% Soil Removal) |
|---|---|---|---|
| A | 6 | 3.4 | 92 |
| C | 14 | 3.4 | 90 |
| E | 30 | 3.4 | 87 |
| H | 5 | 0 | 90 |
| I | 13 | 0 | 80 |

(1)Measured as a 4% aqueous solution at 25° C.

It is beneficial, for film strength reasons, to have as high a molecular weight (viscosity) as possible. High molecular weight films of the prior art, however result in poor clay soil performance (a 13 cPs prior art film yielded about a 10% decrease in cleaning performance over a 5 cPs prior art film). The films of the present invention, however, show only slight decreases in cleaning performance as viscosity is increased from 6 (film A) to 14 cPs (film C) and 30 cPs (film E). For example, film E of the present invention, at a resin viscosity of 30 cPs, exhibits better cleaning performance than a 13 cPs film (film I) of the prior art.

V. Effect of Anionic Nonhydrolyzable Comonomer Content on Initial Solubility

TABLE 5

| Film | | Solubility (% Film Residue After 300 Sec.) 4° C./Water | 21° C./Borate |
|---|---|---|---|
| B | Anionic | 0 | 0 |
| B | Neutral | 50 | 25 |
| C | Anionic | 0 | 0 |
| C | Neutral | 50 | 25 |
| D | Anionic | 0 | 0 |
| D | Neutral | 100 | 100 |

Table 5 shows the neutral copolymer films (e.g. with the comonomer in lactone form) do not dissolve completely in cold or borate-containing water. When the films are in anionic form, i.e., the lactones are converted to the anionic comonomer, however, complete initial dissolution is achieved.

VI. Effect of Anionic Nonhydrolyzable Comonomer Content on Cleaning Performance

The degree of anion content in the copolymer films affects the clay-soil removal efficiency of the paste detergent as well as the initial solubility exhibited in the previous example. This effect was demonstrated by controlling the amount of hydrolysis of lactone groups of film D to vary the anion content of the resin. Cleaning performance was measured as described for Table 4, above.

TABLE 6

| Mole Percent Anionic Nonhydrolyzable Comonomer (Film D) | Percent Soil Removal |
|---|---|
| 3.4 | 91 |
| 2.3 | 90 |
| 1.2 | 87 |
| 0 | 84 |

Table 6 shows that at a given viscosity level of the films of the present invention, better clay soil removal can be achieved by increasing the anionic content of the film, which can be controlled by the amount of comonomer, and in some cases, by the degree of hydrolysis of intermediate lactone groups.

While described in terms of the presently preferred embodiments, it is to be understood that such disclosure is not to be interpreted as limiting. Various modifications and alterations will no doubt occur to those skilled in the art after having read the above disclosure. Accordingly, it is intended that the appended claims be interpreted as covering all alterations and modifications as fall within the true spirit and scope of the invention.

What is claimed is:

1. A water-soluble polymeric film and cleaning composition combination comprising (a) a water-soluble film about 1-5 mils thick, formed from a copolymer resin of vinyl alcohol having about 0-10 mole percent residual acetate groups and about 1-6 mole percent of a nonhydrolyzable anionic comonomer converted from the group of comonomers consisting of (i) unsaturated acids such as acrylic, methacrylic, cis 2-butenoic, 3-butenoic, cinnamic, phenylcinnamic, pentenoic, methylene malonic, the alkali metal and ammonium salts thereof and the acyl halide derivatives thereof;

(ii) unsaturated esters, amides, and acyl halides of the following structure I:

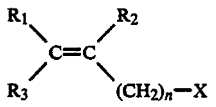

I wherein $R_1$, $R_2$ and $R_3$ are H, or alkyl, aryl or hydroxyalkyl groups, n is 0 or 1, and X is [$-CO_2R_4$, ] $-C(O)NR_4R_5$ or $-COY$ (wherein $R_4$ is H, alkyl, aryl, alkenyl, hydroxyalkyl, oxyalkyl or cyanoalkyl group, $R_5$ is H or an alkyl, aryl or hydroxyalkyl group, and Y is a halide); or X is $CO_2R_4$, wherein $R_4$ is an alkyl, aryl, alkenyl, hydroxyalkyl, oxyalkyl or cyanoalkyl group;

(iii) unsaturated diacids and their stereoisomers of the following structure II:

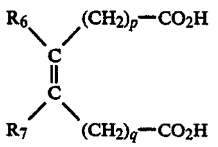

II wherein p and q are integers from 0-5, $R_6$ and $R_7$ are H, or alkyl or aryl groups, and alkali metal and ammonium salts thereof;

(iv) anhydrides, acyclic and cyclic esters, amides and imides derived from structure II;

(v) unsaturated sulfonic acids and derivatives thereof; and (vi) mixtures thereof, the resin being polymerized to an extent to result in a resin viscosity, when dissolved in 25° C. water to a level of about 4% of between about 4-35 cPs, the film including a plasticizing-effective amount of a plasticizer and;

(b) an alkaline or borate-containing cleaning composition, said composition being at least partially enclosed by the film wherein the film will dissolve when placed in an aqueous medium, freeing the cleaning composition.

2. The combination of claim 1 wherein the nonhydrolyzable anionic comonomer is converted from the group of comonomers consisting of acrylic acid, methacrylic acid, methylene malonic acid, methyl acrylate, methyl methacrylate, acrylamide, maleic and itaconic acid anhydrides, methyl esters of maleic and itaconic acids, vinyl sulfonate and mixtures thereof.

3. The combination of claim 1 and further including about 0-30 weight percent of a borate scavenger in the polymeric film.

4. An article for delivering a cleaning composition to a wash liquor comprising (a) an alkaline or borate-containing cleaning composition at least partially enclosed by the film wherein the film will dissolve when placed in an aqueous medium, freeing the cleaning composition; and (b) a copolymeric film material having a thickness of cleaning composition and made from a copolymeric resin produced by copolymerizing vinyl acetate with about 2-6 mole percent of a comonomer to yield a copolymer resin, subsequently saponifying resin to hydrolyze about 90-100 mole percent acetate groups to alcohols, the resulting resin characterized by a viscosity, when dissolved to a level of about 4% in 25° C. water, of between about 4 and 35 cPs, and converting sufficient of the comonomer to result in about 1-6 mole percent of a nonhydrolyzable comonomer having an anionic charge, wherein the comonomer is selected from the group consisting of (i) unsaturated acids such as acrylic, methacrylic, cis 2-butenoic, 3-butenoic, cinnamic, phenylcinnamic, pentenoic, methylene malonic, the alkali metal and ammonium salts thereof and the acyl halide derivatives thereof;

(ii) unsaturated esters, amides, and acyl halides or the following structure I:

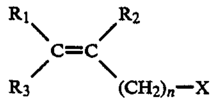

I wherein $R_1$, $R_2$ and $R_3$ are H, or alkyl, aryl or hydroxyalkyl groups, n is 0 or 1, and X is [$-CO_2R_4$,] $-CO_2R_4$, $-C(O)NR_4R_5$ or $-COY$ (wherein $R_4$ is H, alkyl, aryl, alkenyl, hydroxyalkyl, oxyalkyl or cyanoalkyl group, $R_5$ is H or an alkyl, aryl or hydroxyalkyl group, and Y is a halide); or X is $CO_2R_4$, wherein $R_4$ is an alkyl, aryl, alkenyl, hydroxyalkyl, oxyalkyl or cyanoalkyl group;

(iii) unsaturated diacids and their stereoisomers of the following structure II:

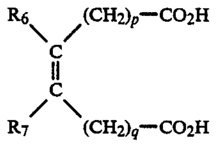

II wherein p and q are integers from 0-5, $R_6$ and $R_7$ are H, or alkyl or aryl groups, and alkali metal and ammonium salts thereof;

(iv) anhydrides, acyclic and cyclic esters, amides and imides derived from structure II;

(v) unsaturated sulfonic acids and derivatives thereof; and (vi) mixtures thereof, the film including a plasticizing-effective amount of a plasticizer;

Wherein the alkaline borate-containing cleaning composition is at least partially enclosed by the film such that the film will dissolve when placed in an aqueous medium, frecing the composition.

5. The article of claim 4 wherein the comonomer is selected from the group consisting of acrylic acid, methacrylic acid, methylene malonic acid, methyl acrylate, methyl methacrylate, acrylamide, maleic and itaconic acid anhydrides, methyl esters of maleic and itaconic acids, vinyl sulfonate, and mixtures thereof.

6. The article of claim 4 wherein the conversion of the comonomer to the nonhydrolyzable comonomer occurs during the saponification.

7. The article of claim 4 wherein the conversion of the comonomer to the nonhydrolyzable comonomer further includes a hydrolysis with an alkaline material, following the saponification.

8. The article of claim 7 wherein the alkaline material is an alkaline-earth metal, alkali-metal, or quaternary ammonium hydroxide, and mixtures thereof.

9. The article of claim 7 wherein the alkaline material is included in the cleaning composition.

10. In a wash article of the type comprising a wash additive at least partially surrounded by a water-soluble, plasticized polyvinyl alcohol film, the improvement comprising (a) making the film from a resin formed by copolymerizing vinyl acetate with about 2-6 mole percent of a comonomer selected from the group consisting of (i) acrylic, methacrylic, cis 2-butenoic, 3-butenoic, cinnamic, phenylcinnamic, pentenoic, and methylene malonic acids, the alkali metal and ammonium salts thereof and the acyl halide derivatives thereof;

(ii) unsaturated esters, amides, and acyl halides of the following structure I:

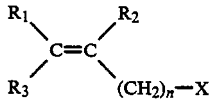

I wherein $R_1$, $R_2$ and $R_3$ are H, or alkyl, aryl or hydroxyalkyl groups, n is 0 or 1, and X is [$—CO_2R_4$,] $—CO_2R_4$, $—C(O)NR_4R_5$ or $—COY$ (wherein $R_4$ is H, alkyl, aryl, alkenyl, hydroxyalkyl, oxyalkyl or cyanoalkyl group, $R_5$ is H or an alkyl, aryl or hydroxyalkyl group, and Y is a halide); or X is $CO_2R_4$, wherein $R_4$ is an alkyl, aryl, alkenyl, hydroxyalkyl, oxyalkyl or cyanoalkyl group;

(iii) unsaturated diacids and their stereoisomers of the following structure II:

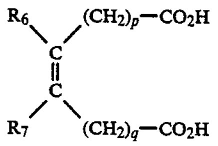

II wherein p and q are integers from 0-5, $R_6$ and $R_7$ are H, or alkyl or aryl groups, and alkali metal and ammonium salts thereof;

(iv) anhydrides, acyclic and cyclic esters, amides and imides derived from structure II;

(v) unsaturated sulfonic acids and derivatives thereof; and (vi) mixtures thereof, to form a copolymer resin;

(b) saponifying the resin to hydrolyze about 90-100 mole percent of acetate groups to alcohols, the copolymer resin being polymerized to an extent to result in a resin viscosity, when dissolved to a level of 4% in water at 25° C., of about 4-35 cPs; and (c) converting sufficient of the comonomer to result in about 1-6 mole percent of an anionic, nonhydrolyzable comonomer.

11. The article of claim 10 wherein the comonomer is selected from the group consisting of acrylic acid, methacrylic acid, methylene malonic acid, methyl acrylate, methyl methacrylate, acrylamide, maleic and itaconic acid anhydrides, methyl esters of maleic and itaconic acids, vinyl sulfonate, and mixtures thereof.

12. The article of claim 10 wherein the conversion of the comonomer to the nonhydrolyzable comonomer occurs during the saponification.

13. The article of claim 10 wherein the conversion of the comonomer to the nonhydrolyzable comonomer further includes a hydrolysis with an alkaline material, following the saponification.

14. The article of claim 13 wherein the alkaline material is an alkaline-earth metal, alkali-metal, or quaternary ammonium hydroxide, and mixtures thereof.

15. The article of claim 13 wherein the alkaline material is included in the wash additive.

16. The article of claim 10 and further including about 0 to 30 weight percent of a borate scavenger in the film.

17. A method for introducing a wash additive to an aqueous wash solution comprising (a) enclosing a wash additive in a sealed water-soluble copolymeric film material produced by copolymerizing vinyl acetate with about 2-6 mole % of a comonomer to yield a copolymer resin, subsequently saponifying the resin to hydrolyze about 90-100 mole percent acetate groups to alcohols, the copolymer resin characterized by a viscosity, when dissolved to a level of about 4% in 25° C. water, of between about 4 to 35 cPs, and converting sufficient of the comonomer to result in about 1-6 mole percent of a nonhydrolyzable comonomer having an anionic charge, wherein the comonomer is selected from the group consisting of (i) unsaturated acids such as acrylic, methacrylic, cis 2-butenoic, 3-butenoic, cinnamic, phenylcinnamic, pentenoic, methylene malonic, the alkali metal and ammonium salts thereof and the acyl halide derivatives thereof;

(ii) unsaturated esters, amides, and acyl halides of the following structure I:

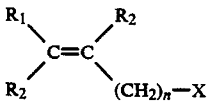

I wherein $R_1$, $R_2$ and $R_3$ are H, or alkyl, aryl or hydroxyalkyl groups, n is 0 or 1, and X is [$—CO_2R_4$,] $—CO_2R_4$, $—C(O)NR_4R_5$ or $—COY$ (wherein $R_4$ is H, alkyl, aryl, alkenyl, hydroxyalkyl, oxyalkyl or cyanoalkyl group, $R_5$ is H or an alkyl, aryl or hydroxyalkyl group, and Y is a halide); or X is $CO_2R_4$, wherein $R_4$ is an alkyl, aryl, alkenyl, hydroxyalkyl, oxyalkyl or cyanoalkyl group;

(iii) unsaturated diacids and their stereoisomers of the following structure II:

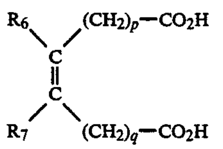

II wherein p and q are integers from 0–5, $R_6$ and $R_7$ are H, or alkyl or aryl groups, and alkali metal and ammonium salts thereof;

(iv) anhydrides, acyclic and cyclic esters, amides and imides derived from structure II;

(v) unsaturated sulfonic acids and derivatives thereof; and (vi) mixtures thereof; and (b) contacting the copolymeric material plus additive with aqueous wash solution for a sufficient time Lo dissolve the polymeric material and disperse the additive contained therein.

18. The method of claim 17 wherein the comonomer is selected from the group consisting of acrylic acid, methacrylic acid, methylene malonic acid, methyl acrylate, methyl methacrylate, acrylamide, maleic and itaconic acid anhydrides, methyl esters of maleic and itaconic acids, vinyl sulfonate, and mixtures thereof.

19. The method of claim 17 wherein the conversion of the comonomer to the nonhydrolyzable comonomer occurs during the saponification.

20. The method of claim 17 wherein the conversion of the comonomer to the nonhydrolyzable comonomer further includes a hydrolysis with an alkaline material, following the saponification.

21. The method of claim 20 wherein the alkaline material is an alkaline-earth metal, alkali-metal, or quaternary ammonium hydroxide, and mixtures thereof.

22. The method of claim 20 wherein the alkaline material is included in the wash additive.

23. The method of claim 17 and further including adding about 0 to 30 weight percent of a borate scavenger in the film.

* * * * *